(12) United States Patent
Saari et al.

(10) Patent No.: US 10,483,812 B2
(45) Date of Patent: Nov. 19, 2019

(54) ELECTRICAL MACHINE AND METHOD OF MANUFACTURE

(71) Applicant: Ingersoll-Rand Company, Davidson, NC (US)

(72) Inventors: Juha Tuomas Saari, Espoo (FI); Petri Juhani Maki-Ontto, Espoo (FI)

(73) Assignee: Ingersoll-Rand Company, Davidson, NC (US)

( * ) Notice: Subject to any disclaimer, the term of this patent is extended or adjusted under 35 U.S.C. 154(b) by 495 days.

(21) Appl. No.: 14/964,125

(22) Filed: Dec. 9, 2015

(65) Prior Publication Data

US 2016/0190878 A1 Jun. 30, 2016

Related U.S. Application Data

(60) Provisional application No. 62/099,064, filed on Dec. 31, 2014.

(51) Int. Cl.
*H02K 9/00* (2006.01)
*H02K 1/20* (2006.01)
(Continued)

(52) U.S. Cl.
CPC .............. *H02K 1/20* (2013.01); *H02K 1/185* (2013.01); *H02K 9/04* (2013.01); *H02K 15/024* (2013.01); *H02K 15/085* (2013.01)

(58) Field of Classification Search
CPC ............ H02K 1/20; H02K 1/18; H02K 15/02; H02K 15/085
(Continued)

(56) References Cited

U.S. PATENT DOCUMENTS 1,196,345 A 8/1916 Field
3,675,056 A * 7/1972 Lenz ........................ H02K 9/20
174/DIG. 19
(Continued)

FOREIGN PATENT DOCUMENTS

CN 1784818 A 6/2006
CN 103155382 A 6/2013
(Continued)

OTHER PUBLICATIONS

European Patent Office Extended European Search Report dated May 19, 2016 cited in counterpart European Patent Application No. 15003687.9 (8 pages).
(Continued)

*Primary Examiner* — Hanh H Nguyen
(74) *Attorney, Agent, or Firm* — Taft Stettinius & Hollister LLP

(57) ABSTRACT

An electrical rotor machine and a method of manufacturing the same are disclosed. According to at least one aspect of the present disclosure, the method includes forming a stator core from two or more subcores and inserting the separate subcores into a housing before windings are wound through and around the subcores to form a stator. In such embodiments, the housing includes a locating feature structured to position and support the subcores such that a flow channel is formed between the subcores. The locating feature enables both radial and axial cooling of the stator core while reducing pressure losses within the cooling flow path.

9 Claims, 4 Drawing Sheets

(51) Int. Cl.
*H02K 15/02* (2006.01)
*H02K 1/18* (2006.01)
*H02K 9/04* (2006.01)
*H02K 15/085* (2006.01)

(58) Field of Classification Search
USPC ........ 310/52, 54, 58, 59, 60 A, 60 R, 62, 66
See application file for complete search history.

(56) References Cited

U.S. PATENT DOCUMENTS

| | | | |
|---|---|---|---|
| 3,740,595 A | 6/1973 | Heller et al. | |
| 4,182,137 A * | 1/1980 | Erth | H02K 1/20 310/61 |
| 4,298,812 A | 11/1981 | Damiron et al. | |
| 5,710,471 A * | 1/1998 | Syverson | H02J 7/1423 310/114 |
| 6,218,757 B1 * | 4/2001 | Ong | H02K 11/01 310/223 |
| 6,740,993 B2 | 5/2004 | Greubel et al. | |
| 6,774,515 B2 | 8/2004 | Mori et al. | |
| 7,462,962 B2 | 12/2008 | De Bock et al. | |
| 7,482,725 B2 | 1/2009 | Down et al. | |
| 7,692,352 B2 | 4/2010 | Sirois | |
| 7,737,586 B2 | 6/2010 | Tounosu et al. | |
| 2007/0024129 A1 * | 2/2007 | Pfannschmidt | H02K 1/20 310/59 |
| 2012/0080982 A1 * | 4/2012 | Bradfield | H02K 1/20 310/60 A |
| 2013/0076169 A1 | 3/2013 | Pal | |
| 2014/0265657 A1 * | 9/2014 | Raczek | H02K 9/19 310/54 |

FOREIGN PATENT DOCUMENTS

| | | |
|---|---|---|
| JP | S60257736 A | 12/1985 |
| JP | 2001045713 A | 2/2001 |
| WO | 2004093292 A2 | 10/2004 |

OTHER PUBLICATIONS

State Intellectual Property Office, P.R. China, CN First Office Action and English Translation of CN First Office Action dated Apr. 25, 2018 in counterpart CN Patent Application No. 201511036119.5 (7 pages).

* cited by examiner

ELECTRICAL MACHINE AND METHOD OF MANUFACTURE

CROSS REFERENCE TO RELATED APPLICATIONS

This application claims the benefit of U.S. Provisional Application No. 62/099,064, filed Dec. 31, 2014, which is incorporated herein by reference in its entirety.

TECHNICAL FIELD

The present disclosure generally relates to electrical machines and, more specifically, to electrical rotor machines and manufacture of the same.

BACKGROUND

Electrical machines, including, for example, electric motors and generators, generate heat that is often associated with electrical and mechanical losses within the machines. In rotating electrical machines losses are particularly high during starting or dynamic braking. The amount of heat generated by a particular electrical machine may depend on a variety of different factors, including, for example, the magnitude of the load on the electrical machine and the frequency of the starting and braking of the electrical machine, among other factors. Cooling of electrical machines is often necessary to continuously transfer the heat from the machine to mitigate a variety of heat-induced problems that may hinder the operation and/or shorten the life span of electrical machines, including short circuits and winding burnout and failure, among other heat related issues.

Cooling of electrical machines often involves transferring the heat generated by the machine to a cooling medium, such as air, for example. Conventionally, electrical machines are cooled externally from the outer surface of the housing enclosing the operational components of the machine, often by one or more fans mounted on the shaft of the machine. To allow for operation of the machine in either direction of rotation, the fans are usually of the bi-directional type and made of a strong plastic, aluminum, or steel material. However, such cooling methods require that the heat be conducted from the windings through the core yoke, core/housing shrink fit, and the wall of the housing. In certain machines, this heat flow path is not adequate to prevent overheating because the heat flux generated within the machine is too great to be removed via conduction through the cross-sectional area of the available heat flow path. Alternatively, the cooling medium may be flowed through the machine. However, such a cooling scheme requires power to generate an adequate cooling flow, which lowers the efficiency of the electrical machine. Moreover, such a cooling scheme requires cooling flow paths be formed through the machine, which inevitably include pressure losses and increase the complexity and cost of manufacturing the electrical machines. Accordingly, there remains a need for further contributions in this area of technology.

SUMMARY

An electrical rotor machine and a method of manufacturing the same are disclosed. According to at least one aspect of the present disclosure, the method includes forming a stator core from two or more subcores and inserting the separate subcores into a housing before windings are wound through and around the subcores to form a stator. In such embodiments, the housing includes a locating feature structured to position and support the subcores such that a cooling channel is formed between the subcores. The locating feature enables both radial and axial cooling of the stator core while reducing pressure losses within the cooling flow path. This summary is provided to introduce a selection of concepts that are further described herein in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
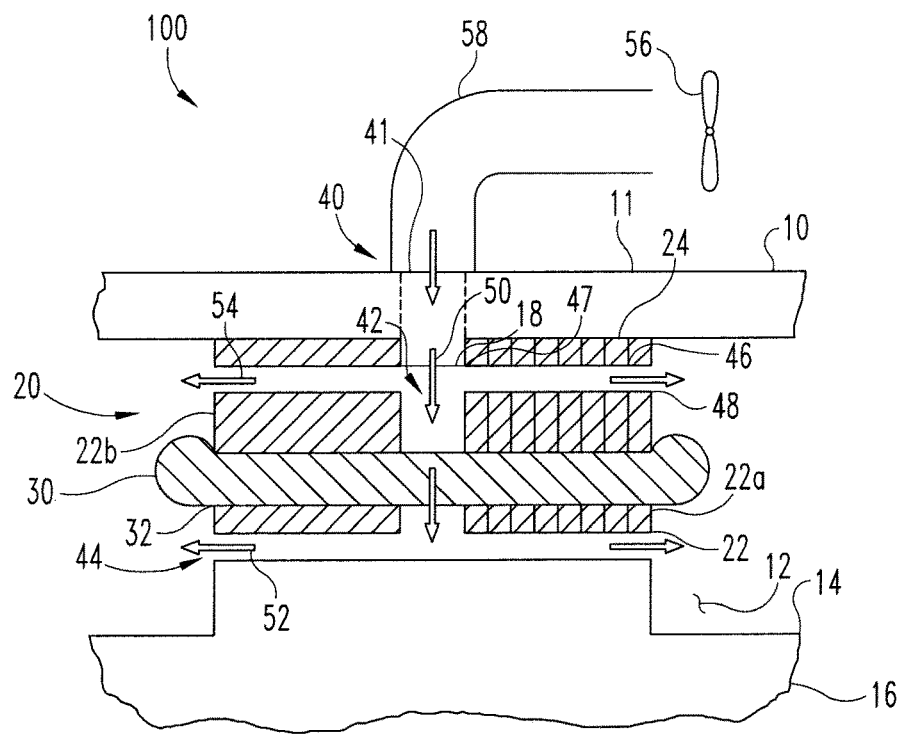
FIG. 1 is a cross-sectional view of a portion of an electrical rotor machine according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The present application discloses various embodiments of an electrical rotor machine and methods for using and constructing the same. According to one aspect of the present disclosure, the method includes forming a stator core from two or more subcores and inserting the separate subcores into a housing before windings are wound through and around the subcores to form a stator. In such embodiments, the housing includes a locating feature structured to position and support the subcores such that a cooling channel is formed between the subcores. The locating feature enables both radial and axial cooling of the stator while reducing pressure losses within the cooling flow path, thereby improving the operating range and efficiency of the electrical rotor machine.

An electrical rotor machine 100 including a cooling system 40 is shown in FIG. 1 according to at least one embodiment of the present disclosure. The illustration of FIG. 1 depicts a cross-sectional view of a portion of the machine 100, specifically a central portion about a central longitudinal axis 16 of the machine 100. In at least one embodiment, the machine 100 is substantially symmetric about the axis 16. As shown in FIG. 1, the machine 100 may include a housing 10 having a housing wall 11 generally defining a cavity 12 therein. The housing 10 is configured to house components of the machine 100. In certain embodiments, the housing 10 may be a yoke for the machine 100, providing both mechanical support and carrying magnetic flux generated by the machine 100 in operation. The cavity 12 may have any suitable shape and configuration, including, as one non-limiting example, a generally cylindrical shape defined by the wall 11 of the housing 10, which may be substantially cylindrically shaped. The machine 100 may further include a rotor/shaft assembly 14 disposed at least partially within the cavity 12 along the axis 16. The rotor/shaft assembly 14 may include a rotatable shaft operably mounted to a rotor such that the rotor/shaft assembly 14 rotates about the axis 16. The rotor/shaft assembly 14 may be a conventional assembly of a rotor and shaft for an electrical rotor motor configured to operate with other components and aspects of the machine 100. The machine 100 may further include a stator 20 disposed within the cavity 12 and surrounding the rotor/shaft assembly 14 as described further herein.

The electrical rotor machine 100 may be one of a variety of different types of electrical motors and generators, including, but not limited to, induction motors. Further, the machine 100 may have a variety of operating parameters and characteristics. For example, according to certain embodiments, the machine 100 may be a high speed induction motor, which may operate at a variety of different speeds, including, for example, at speeds in excess of 7,200 revolutions per minute (rpm), 15,000 rpm, or 30,000 rpm. Further, for example, according to certain embodiments, the machine 100 may be a relatively low voltage induction motor, such as, for example, an induction motor that may be wound for voltages from around 400 volts to around 700 volts, among other voltages. In alternative embodiments, the machine 100 may operate at speeds and voltages outside of the exemplary ranges provided.

Figure 2:
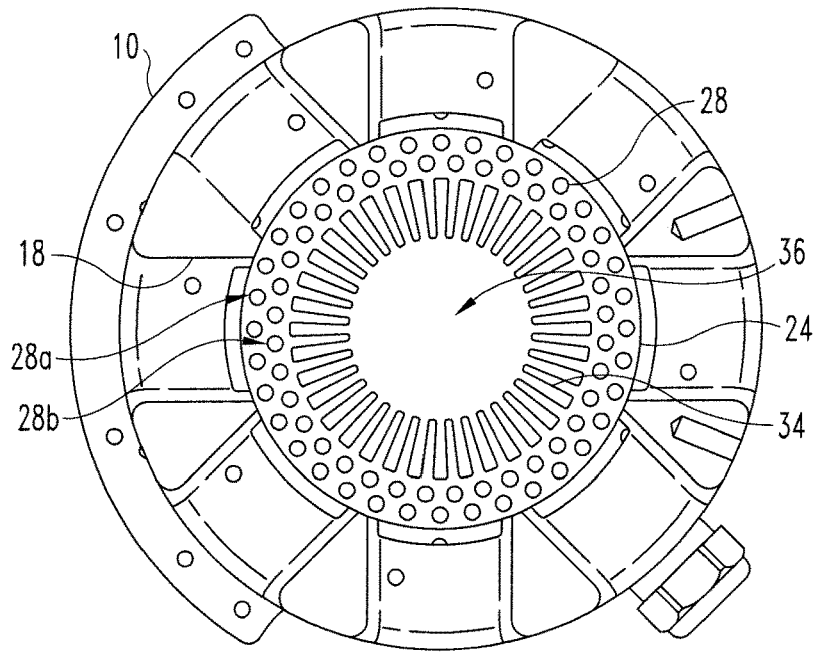
FIG. 2 is a front view of a lamination of an electrical rotor machine according to the present disclosure.

As illustrated in FIG. 1, the stator 20 may include two or more subcores 22, which may be supported or otherwise secured within the cavity 12 of the housing 10. Though the stator 20 may include more than two separate subcores 22, two subcores 22a, 22b are depicted. Each subcore 22 may be formed of a plurality of laminations 24 that are stacked and bonded together to form the subcore 22. FIG. 2 shows a front view of a lamination 24 comprising a subcore 22. The laminations 24, and the composite subcores 22, may be any suitable shape. In embodiments where the cavity 12 of the housing 10 has a generally cylindrical shape, the laminations 24 may be substantially circular in front view as shown in FIG. 2, as may be the composite subcores 22. The laminations 24 and subcores 22 may be made of any suitable electromagnetic material such as steel plate, for example. In alternative embodiments, instead of an assembly of separate laminations 24, each subcore 22 may be manufactured as an integral, solid part having the features shown in FIG. 2 as described further herein. Further, in certain embodiments, the subcores 22 may be operably connected to at least one magnet.

The individual subcores 22 may be positioned and supported within the cavity 12 by at least one locating feature 18 of the housing 10. The locating feature 18 may be a tab, boss, rib, knob, or other suitable protrusion from an interior surface of the wall 11 of the housing 10 capable of positioning and supporting each subcore 22 and maintaining the relative positions of each subcore 22 to one another. The particular form of the locating feature 18 may vary between embodiments of present disclosure. Regardless of specific form, the locating feature 18 extends into the cavity 12 and enables each subcore 22 to seat within the housing 10 such that the subcores 22 are spaced apart from one another at a fixed distance. In certain embodiments, the locating feature 18 may be formed as an integral part of the housing 10. In such embodiments, the locating feature 18 may be machined into the housing 10 by any appropriate method. Alternatively, the locating feature may be manufactured separately from the housing 10 and attached to the housing 10. In such embodiments, the locating feature 18 may be shrink-fit, press-fit, welded, fastened, or attached by any suitable means.

The stator 20 may further include a plurality of stator windings 30 extending axially between and around each subcore 22 as shown in FIG. 1. The stator windings 30 may be disposed within winding channels 32 formed through each subcore 22. As shown in FIG. 2, each lamination 24 includes a plurality of the winding grooves 34 formed therethrough and distributed circumferentially around a central opening 36 through the lamination 24, such that each winding groove 34 is in communication with the opening 36. The opening 36 may be formed substantially about a centroid of the lamination 24. In assembly, the winding grooves 34 of the individual laminations 24 are aligned and combine to form a plurality of winding channels 32 through which the windings 30 are wound. Accordingly, the winding channels 32 of adjacent subcores 22 may further be aligned as shown in FIG. 1, such that the windings 30 may extend axially between the corresponding winding channels 32 of the subcores 22 in a straight line.

The windings 30 may be made of a plurality of strands of a conductive material drawn into a wire. As non-limiting examples, the windings 30 may be copper, carbon, silver, aluminum, or alloys thereof. Though depicted as a solid mass in FIGS. 1 and 3, the windings 30 may be formed by looping multiple strands of the wire through the winding channels 32 of adjacent subcores 22 and around opposite ends of the subcores 22 and by continuing the looping process around the periphery of the opening 36. Each loop of the strands forming the winding 30 is commonly referred to as a turn. During assembly, a predetermined number of strands may be looped through the winding channels 32 to form the windings 30. In operation, the windings 30 carry electric current to generate an electromagnetic field. Significant heat may be generated in the windings 30 during operation due to the flow of electric current, and that heat may be conducted into the subcores 22, housing 10, rotor/shaft assembly 14, and other components of the machine 100. The heat generated in the windings 30, and by electrical and mechanical losses in the machine 100, must be dissipated to prevent excessive temperatures and overheating, which may damage the machine 100.

Referring to FIG. 1, the machine 100 may further include a cooling system 40 having both radial and axial aspects. In at least one embodiment according to the present disclosure, the cooling system 40 may include a radial coolant path 50, an inner axial coolant path 52, and an outer axial coolant path 54 for routing a flow of the coolant through the machine 100. In certain embodiments, the cooling system 40 may include a plurality of axial coolant paths. The coolant may be air such as, for example, ambient air or cooled air. Alternatively, the coolant may be any suitable gas, such as pure nitrogen, compatible with the electrical components and operation of the machine 100.

Figure 3:
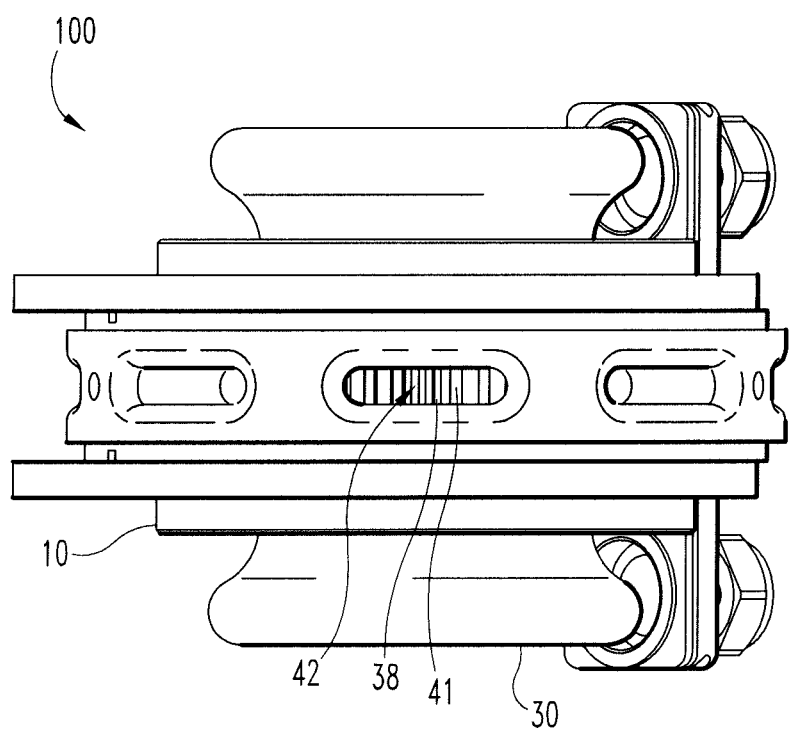
FIG. 3 is a plan view of an electrical rotor machine according to the present disclosure.

FIG. 3 shows a plan view of the machine 100 in which the rotor/shaft assembly 14 is not shown for clarity. The cooling system 40 may include a plurality circumferentially spaced radial channels 42 distributed about the rotor/shaft assembly 14. FIG. 1 illustrates one such radial channel 42. The radial channels 42 are at least partially defined by the space between the subcores 22 (e.g., the subcores 22a, 22b of FIG. 1). The radial channels 42 are further defined by circumferentially spaced housing inlets 41 formed through the wall 11 of the housing 12. The housing inlets 41 and the radial channels 42 enable a flow of coolant from outside of the housing 10, through the housing inlets 41, into the cavity 12, and between the subcores 22, thereby drawing heat from the subcores 22 and windings 30. The housing inlets 41 may be circumferentially spaced such that at least one locating feature 18 may be positioned between each housing inlet 41. Alternatively, the housing 10 may include fewer than one locating feature 18 between each housing inlet 41. Regardless, the locating features 18 does not interfere with or block the flow of coolant through the radial channels 42. The cross-section of FIG. 1 illustrates one housing inlet 41 and locating feature 18. For clarity, the housing inlet 41 has been depicted in hidden line through the wall 11 to indicate that the inlet 41 is not in the same plane as the locating feature 18, which is depicted in solid line.

The radial channels 42 may be generally oriented perpendicular to the longitudinal axis 16 of the machine 100. However, the radial channels 42 may include other configurations and orientations. According to certain embodiments, the radial channels 42 may be located at approximately a central or midpoint location along an axial length of the stator 20, the axial length being generally in a direction that is parallel to the longitudinal axis 16. More specifically, referring to FIGS. 1 and 3, the radial channels 42 may be configured such that the subcores 22a, 22b on opposing sides of the radial channels 42 are generally symmetrical and/or have approximately equal axial lengths.

As shown in FIGS. 1-3, the windings 30, being looped through the winding channels 32 of the subcores 22, are bundled such that a winding gap 38 may be formed between each winding bundle. The winding gap 38 enables the flow of coolant to run around and past each winding bundle and to proceed to the rotor/shaft assembly 14 within the aperture 36 of the subcores 22. Accordingly, in FIG. 1, the radial coolant path 50 is depicted as extending from outside the housing 10, over the windings 30, and to the rotor/shaft assembly 14. Thus, the radial channels 42 enable the radial coolant path 50, which draws heat from both the subcores 22 and the windings 30, heat that is generated during operation of the machine 100. Further, the radial coolant path 50 is in fluid communication with the inner axial coolant path 52 and the outer axial coolant path 54, thereby supplying the inner and outer axial coolant paths 52, 54 with coolant.

Referring to FIG. 1, the cooling system 40 may include the inner axial coolant path 52. The inner axial coolant path 52 may extend from the radial channel 42, where the radial coolant path 50 impinges upon the rotor/shaft assembly 14, and through a rotor gap 44 between the stator 20 (i.e., the subcores 22) and the rotor/shaft assembly 14. The rotor gap 44, which in FIG. 1 is exaggerated in size for clarity, provides a clearance between the stationary stator 20 and the rotating rotor/shaft assembly 14 to enable rotation of the rotor/shaft assembly 14 relative to the stator 20. Moreover, the rotor gap 44 enables the inner axial coolant path 52 to extend from the radial channel 42 to each axial end of the stator 20, thereby enabling the coolant to draw heat from the rotor/shaft assembly 14 and innermost portions of the stator 20.

The cooling system 40 may further include the outer axial coolant path 54. In certain embodiments, the cooling system 40 may include a plurality of outer axial coolant paths 54. As shown in FIG. 2, each lamination 24 may include a plurality of apertures 28 formed therethrough. Though depicted as circular in FIG. 2, the apertures 28 may have a variety of suitable shapes, configurations, arrangements, and orientations. In embodiments, where the individual laminations 24 are stacked and bonded together to form the subcore 22, the apertures 28 combine to form a plurality of stator ducts 46 extending between opposing ends of each subcore 22. Two such stator ducts 46 are shown in FIG. 1, one in each subcore 22. In embodiments where the apertures 28 are circular, the composite stator duct 46 may be a generally cylindrically shaped passage extending axially parallel to the longitudinal axis 16. Further, the axial lengths of the stator ducts 46 may be substantially the same. In such an embodiment, the stator ducts 46 extend from the radial channels 42 to the opposite axial end of the subcores 22. Accordingly, each stator duct 46 may include a duct inlet 47 adjacent the radial channel 42 and an opposing duct outlet 48 at the terminus of the duct 46.

In at least one embodiment, the plurality of apertures 28 may be arranged in concentric rings having different radii from a centroid of each lamination 24. As shown in FIG. 2, the plurality of apertures 28 may be arranged in a first set 28a and a second set 28b in which the first set 28a is offset or staggered relative to the second set 28b such that the apertures 28 of the first set 28a are not radially in line with the apertures 28 of the second set 28b. Consequently, the plurality of stator ducts 46 (not shown in FIG. 2), formed from the assembly of the laminations 24 having the apertures 28, may be similarly arranged in staggered concentric sets. Alternatively, the apertures 28 and composite stator ducts 46 may be arranged in any suitable configuration that enables a desired heat transfer while maintaining sufficient structural strength in the subcores 22 to withstand the mechanical and thermal stresses of the machine 100 in operation. Further, according to certain embodiments, the apertures 28 and composite stator ducts 46 may be configured, sized, and/or shaped to enable the desired heat transfer.

The plurality of stator ducts 46 enable the outer axial cooling path 54 to extend from the radial channel 42 to the opposing ends of each subcore 22. Accordingly, the outer axial cooling path 54 may include a plurality of paths, one through each stator duct 46. The duct inlet 47 and duct outlet 48 of each stator duct 46 may be configured in size and shape to control the rate of coolant flow through a given stator duct 46. In certain embodiments, the duct inlets 47 and duct outlets 48 may be configured to generate turbulence in the flow of coolant, which may increase the rate of heat transfer thereto. According to certain embodiments, each subcore 22 may be capped by a pair of end plates (not shown), the end plates including the duct inlets 47 and duct outlets 48. The end plates may have a shape generally similar or corresponding to the laminations 24 and may be constructed from a non-magnetic material so as to minimize iron losses. The end plates enable the size, shape, and configuration of the duct inlets 47 and duct outlets 48 of each subcore 22 to be different than the apertures 28, thereby enabling flexibility in the configurations of the duct inlets 47 and duct outlets 48.

The cooling system 40 may be configured to control the relative quantities of coolant supplied from the radial channel 42 to cool the stator 20 through the stator ducts 46 (i.e., the outer axial coolant path 54) and, thereby the amount of coolant that flows into the rotor gap 44 between the stator 20 and the rotor/shaft assembly 16 (i.e., the inner axial coolant path 52). Such division of the coolant may be based on operating characteristics of the machine 100, including, for example, the anticipated pressure losses between the stator 20 and rotor/shaft assembly 16, as well as losses attributable to flow friction. For example, according to certain embodiments, the amount of coolant desired to flow through the inner axial coolant path 52 may be increased by a decrease in the size and/or number of stator ducts 46 in the subcores 22, which restricts flow through the outer axial coolant path 54.

The cooling system 40 enables convective cooling of the machine 100. Specifically, the radial coolant path 50 enables the introduction of the coolant into the machine 100 between the subcores 22 and over at least a portion of the windings 30. The flow of coolant along the radial coolant path 50 facilitates convective heat transfer from the relatively subcores 22 and windings 30 to the relative cool coolant. Because the radial coolant path 50 is in fluid communication with the inner and outer axial coolant paths 52, 54, the flow of coolant along the radial coolant path 50 may continue via the inner and outer axial coolant paths 52, 54, thereby drawing additional heat from the relatively hot subcores 22 and windings 30. Further, as the coolant flow from the inner and outer axial coolant paths 52, 54 exits the stator 20 via the duct outlets 48, the coolant may flow over the loops of the windings 30 that extend beyond the subcores 22, further facilitating heat transfer directly from the windings 30. Upon exiting the stator 20, the coolant may exit the cavity 12 of the housing 10 through vents, seams, gaps, and/or other flow path (not shown) from the cavity 12 to the environment.

In at least one embodiment, the cooling system 40 may include a fan 56 to push and/or pull the coolant through the radial coolant path 50, inner axial coolant path 52, and outer axial coolant path 54 to enable forced convection. Forced convection increases the rate of heat transfer between the coolant and the machine 100, and the rate of heat transfer is proportional to the rate of flow of the coolant through the cooling system 40. The fan 56 may be any suitable flow generation device, for example a blower, bellows, or pressure reservoir, capable of generating a flow of the coolant. In certain embodiments, the fan 56 may be located remotely from the machine 100 and connected in fluid communication to the housing inlet 41 via a conduit 58 as shown in FIG. 1. In certain embodiments, the fan 56 may recirculate the coolant. In such an embodiment, the cooling system 40 may include conduits to accept the flow of coolant from the cavity 12 and route the same back through the fan 56. Such embodiments may further include additional components to actively cool the coolant returning from the cavity 12. Such components may include a refrigeration system.

Pressure losses within the cooling system 40 may tend to lower the power efficiency of the machine 100. Pressure losses increase the pressure difference required to generate sufficient flow of coolant through the coolant system 40, which further requires increased power input to the fan 56, in such embodiments, or decreased output from the machine 100 to limit temperature rise. Pressure losses result from friction between the flow of coolant and the various channels, ducts, and gaps through which the radial coolant path 50, outer axial coolant path 54, and inner axial coolant path 52 proceed. Further pressure losses result from changes in flow area along each of the coolant paths 50, 52, 54. Moreover, pressure losses may result from obstructions in the coolant paths 50, 52, 54 that decrease the effective flow area, at least locally. Consequently, the power required to adequately cool the machine 100 is dependent upon the pressure losses in the cooling system 40. Accordingly, reduction of such pressure losses increases the overall power efficiency of the machine 100.

Conventional electric motors that have radial cooling channels use supports between the subcores to position and assembly the subcores together. These supports are obstructions in the cooling channel that increase pressure losses and lower the efficiency of the conventional electric motor. In contrast, the machine 100 does not include assembly supports in the radial channels 42. The machine 100 employs the locating feature 18 in the housing 10 to position and support the individual subcores 22 within the cavity 12. As described herein, the locating features 18 may be circumferentially spaced and positioned between the housing inlets 41 such that the locating features 18 do not interfere with or block the flow of coolant through the radial channel 42. Consequently, the machine 100 has lower pressure losses and higher overall power efficiency than conventional electric motors.

The degree to which the locating feature 18 extends into the cavity 12 is limited to further minimize pressure losses. Specifically, the locating feature 18 extends no further than an outer edge of an outermost stator duct 46 and, thus, does not disrupt the flow of coolant through any stator duct 46. Because the locating features 18 are positioned between the housing inlets 41 and do not extend across the stator ducts 46, the locating features 18 have minimal contribution to pressure losses in the cooling system 40. Moreover, the limited size of the locating features 18 increases the effective flow area of the radial coolant path 50. Once the coolant flows through the housing inlets 41 and past the locating features 18, the once separate radial channels 42 merge into a shared volume between the subcores 22, the shared volume having an effective flow area defined by the unobstructed region between the subcores 22. Therefore, the locating features 18 are positioned and sized to enable the unobstructed radial coolant path 50, which reduces pressure losses relative to conventional electric motors.

To adequately position and retain the individual subcores 22 within the housing 10 without conventional supports, the machine 100 employs a novel method of manufacture. The schematic flow description that follows provides an illustrative embodiment of a method of manufacturing the machine 100. Operations illustrated are understood to be exemplary only, and the operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

Figure 4:
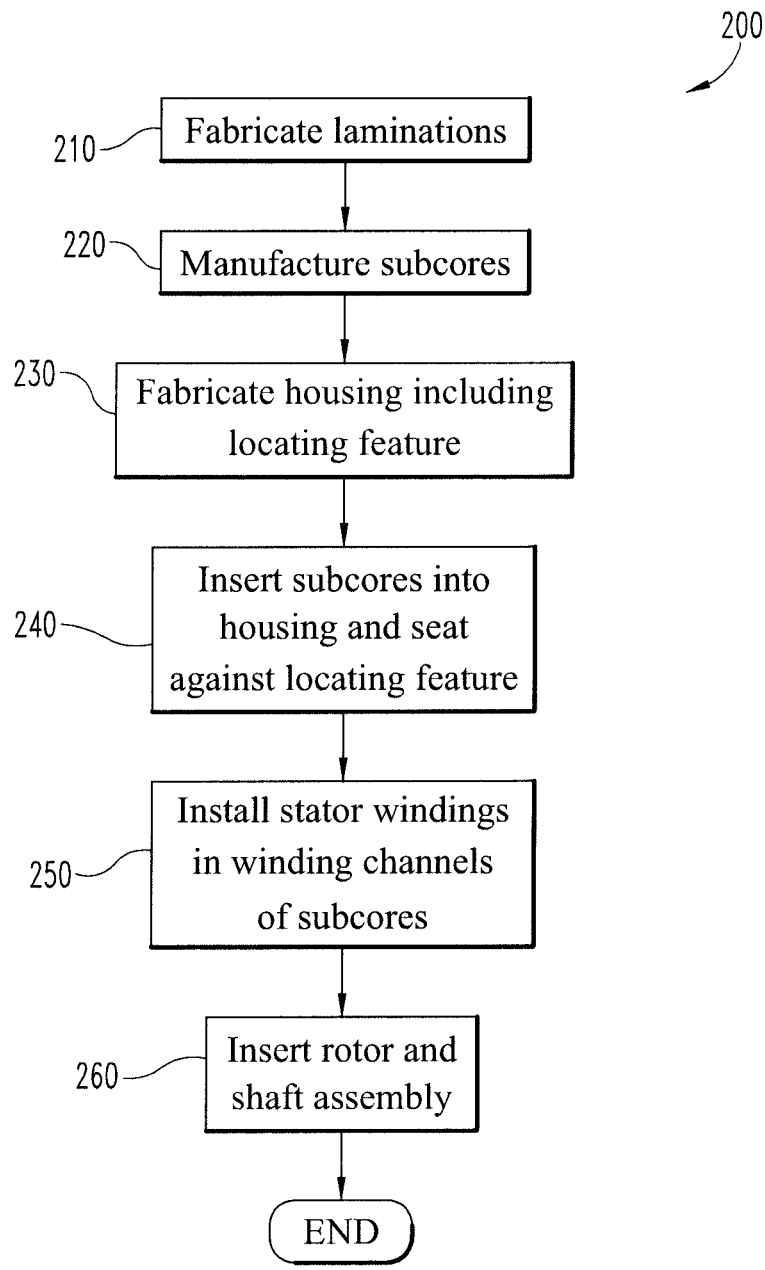
FIG. 4 is a schematic flow diagram of a method of manufacturing an electrical rotor machine according to the present disclosure.
Figure 5:
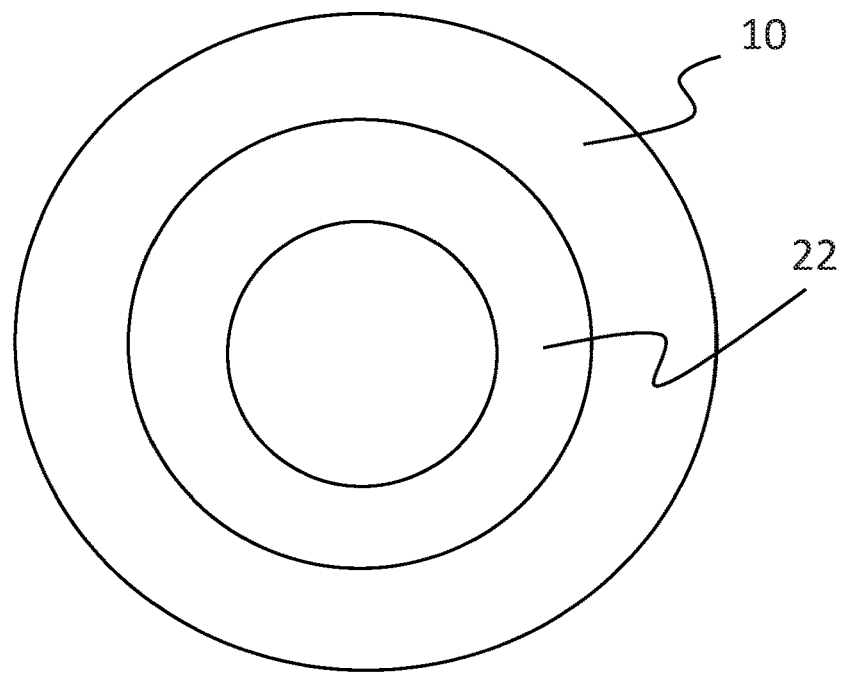
FIG. 5 is a cross-sectional view of the electrical machine illustrating the housing and subcore.
Figure 6:
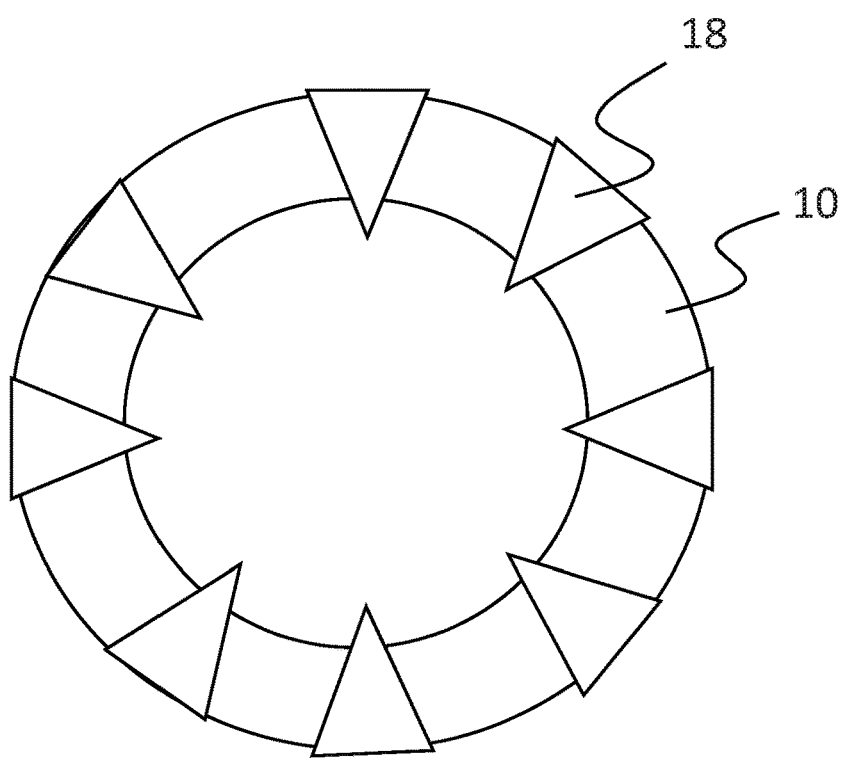
FIG. 6 is a cross-sectional view of the electrical machine illustrating the housing and locating features.

As shown in FIG. 4, a method 200 of manufacturing the machine 100 may include an operation 210 of manufacturing the laminations 24. The laminations 24 may be cut or stamped from steel plate or other suitable material. Alternatively, the laminations 24 may be cast. The operation 210 may include processes such as deburring or post-fabrication machining. The method 200 may include an operation 220 of assembling the laminations 24 into at least two subcores 22. The laminations 24 may be assembled by conventional methods known in the art. The method 200 may further include an operation 230 of manufacturing the housing 10 such that the housing 10 includes the locating feature 18 and is configured to receive the subcores 22. The housing 10 may be manufactured by casting or other suitable process. In certain embodiments, the locating feature 18 may be machined into the housing. Alternatively, the locating feature 18 may be cast or machined separately and then assembled to the housing 10 by a shrink-fit, press-fit, welding, fastening, or other suitable process.

Having at least partially manufactured the housing 10 and subcores 22, the method 200 may include an operation 240 of inserting the subcores 22 within the cavity 12 of the housing 10 such that each subcore 22 seats against at least one locating feature 18. The subcores 22 may be inserted into the housing 10 and retained therein by a shrink-fit between the subcores 22 and housing 10, by a press-fit, by a mechanical fastener, by an adhesive, and/or by other suitable means. With the subcores 22 inserted into the housing 10, the method 200 may include an operation 250 of installing the windings through and around the winding channels 32 of the subcores 22 to form the stator 20. The operation 250 may include further processes such as winding the windings 30 from separate strands of wire, bundling and insulating the windings 30 of one winding channel 32 from the windings 30 of another winding channel 32, lining the each winding channel 32 of the subcores 22 with insulation, and other appropriate processes to prevent electrical shorts between the windings 30 and the subcores 22. The method 200 may further include an operation 260 of inserting the rotor/shaft assembly 14 into the housing 10 within the stator 20 to form the machine 100. The operation 260 may include further processes such as placing bearings on opposing ends of a shaft of the rotor/shaft assembly 14, and assembling covers on opposing ends of the housing 10 to cap the housing 10 such that the shaft of the rotor/shaft assembly 14 extends through the cover. In embodiments including the fan 56 and/or conduit 58, the method 200 may include an operation of connecting the fan 56 and/or conduit 58 to the machine 100.

In at least one embodiment according to the present disclosure, a method of manufacturing the machine 100 may include an alternative operation of fabricating the subcores 22. In such an embodiment, the subcores 22 may be manufactured individually as an integral whole, instead of as an assembly of laminations 24. The subcores 22 may be cast, machined, molded, or manufactured by any suitable process. Suitable machining processes may include electrical discharge machining ("EDM"). In at least one embodiment, the subcores 22 may be manufactured using an additive manufacturing process. Additive manufacturing is the process of forming an article by the selective fusion, sintering, or polymerization of a material stock. Additive manufacturing includes the use of a discretized computer-aided design ("CAD") data model of a desired part to define layers that may be processed successively in sequence to form the final integrated part. Additive manufacturing includes powder bed fusion ("PBF") and powder spray fusion ("PSF") manufacturing processes, including selective laser melting, direct metal laser sintering, selective laser sintering, and electron beam melting. PBF and PSF processes share a basic set of process steps, including one or more thermal sources to induce melting and fusing between powder particles of a material stock, a means for controlling fusion of the powder particles within prescribed regions of each layer of the discretized CAD model, and a means of depositing the powder particles on the previously fused layers forming the part-in-process. The prescribed regions of each layer are defined by the cross-section of the part CAD model in a given layer. Because the powder particles are melted and fused to the previous layer, the resultant part may be solid, substantially fully dense, substantially void-free, and has substantially equivalent or superior thermal and mechanically properties of a part manufactured by conventional molding, casting, or machining methods. Alternatively, the resultant part may include a desired degree of porosity by appropriate control of the manufacturing process.

As is evident from the figures and text presented above, a variety of embodiments of an electrical rotor machine and methods for using and constructing the same according to the present disclosure are contemplated. While the invention has been illustrated and described in detail in the drawings and foregoing description, the same is to be considered as illustrative and not restrictive in character, it being understood that only certain exemplary embodiments have been shown and described. Those skilled in the art having the benefit of the present disclosure will appreciate that many modifications, including equivalent substitutions, are possible in the example embodiments without materially departing from the scope of the invention. Accordingly, all such modifications are intended to be included within the scope of this disclosure as defined in the following claims.

In one aspect, the present disclosure includes a method of manufacturing an electrical machine, the method comprising: fabricating two or more subcores, the subcores including a plurality of winding channels along an axial length of each subcore, the winding channels structured to receive stator windings; fabricating a housing having a wall defining a volume, the housing structured to support the subcores within the volume, the housing further including an aperture through the wall and a locating feature structured to position the subcores; inserting each subcore into the volume of the housing, wherein the subcores seat against opposing sides of the locating feature, whereby a flow channel is formed between the subcores, the flow channel aligned and in communication with at least one of the aperture of the housing; and installing the stator windings in the winding channels of the subcores to form a stator within the housing, whereby the stator windings extend through the winding channels of adjacent subcores.

In refining aspects, the present disclosure includes a method further comprising inserting a rotor and shaft assembly into the housing within the stator; wherein the aperture and the flow channel form a cooling path through the stator, the cooling path configured to enable a coolant to flow between the subcores and over the stator windings, wherein the locating feature is positioned outside the cooling path; wherein the cooling path is substantially perpendicular to a longitudinal axis of the machine; wherein the subcores are shrink-fit to the housing; wherein the subcores are fastened to the housing by a mechanical fastener or an adhesive; wherein the stator comprises two subcores positioned by the locating feature therebetween; wherein the housing comprises a plurality of apertures circumferential spaced about the wall and comprises a plurality of locating features positioned between the apertures; wherein the locating feature is fabricated separately from the housing and attached thereto.

In another aspect, the present disclosure includes a method of manufacturing an electrical rotor machine, the method comprising: fabricating a plurality of stator laminations, each lamination including a plurality of slots; manufacturing at least two subcores by assembling a prescribed portion of the plurality of laminations to form each subcore, wherein the plurality of slots of the laminations are aligned to form a plurality of winding channels through each subcore along a longitudinal axis, the winding channels structured to receive stator windings; fabricating a housing defining a cavity, the housing structured to support the subcores within the cavity and including a plurality of apertures formed therethrough to enable a flow of a coolant into the cavity, wherein the housing further includes a feature structured to locate the subcores within the cavity, wherein the feature is disposed within the cavity between the apertures; inserting each subcore into the housing such that the subcores are separated by the feature of the housing to form a flow channel between each subcore, the flow channel in fluid communication with at least one of the apertures of the housing; installing the stator windings in the winding channels of the subcores to form a stator within the housing, whereby the stator windings extend through the winding channels of adjacent subcores; and inserting a rotor and shaft assembly into the housing within the stator.

In refining aspects, the present disclosure includes a method wherein the apertures and the flow channel form a cooling path through the stator, the cooling path configured to enable a coolant to flow between the subcores and over the stator windings, wherein the feature of the housing is positioned outside the cooling path.

In another aspect, the present disclosure includes an electrical rotor machine comprising: a housing including a wall defining a volume and including a locating feature on the wall within the cavity, the housing including an aperture through the wall adjacent the locating feature; a stator comprising: two subcores disposed within the cavity and seated against opposing edges of the locating feature, wherein a radial channel is formed between the subcores, the radial channel in fluid communication with the aperture of the housing, and wherein the subcores further including a plurality of winding channels along an axial length of each subcore, the plurality of winding channels structured to receive stator windings, and stator windings disposed within the plurality of winding channels of the subcores, wherein the stator windings extend between the subcores and across the radial channel; and a rotor operably attached to a shaft and disposed within the stator, the shaft structured to rotate about a longitudinal axis of the machine.

In refining aspects, the present disclosure includes a machine wherein the housing comprises a plurality of apertures circumferential spaced about the wall and comprises a plurality of locating features positioned between the apertures; wherein the radial channel is substantially perpendicular to the longitudinal axis; wherein the rotor is positioned relative to the stator to form a gap therebetween, the gap extending axially and substantially parallel to the longitudinal axis, the gap further in fluid communication with the radial channel; wherein each subcore comprises a plurality of ducts radially spaced from the winding channels and substantially parallel to the longitudinal axis, the ducts in fluid communication with the radial channel and extending from the radial channel to opposing sides of each subcore.

Further, in describing representative embodiments, the disclosure may have presented a method and/or process as a particular sequence of operations. However, to the extent that the method or process does not rely on the particular order of operations set forth herein, the method or process should not be limited to the particular sequence of operations described. Other sequences of operations may be possible. Therefore, the particular order or sequence of the operations disclosed herein should not be construed as limitations of the present disclosure. Such sequences may be varied and still remain within the scope of the present disclosure.

The invention claimed is:

1. An electrical rotor machine comprising:
a housing including a wall defining a cavity and including a locating feature on the wall within the cavity, the housing including an aperture through the wall adjacent the locating feature;
a stator comprising:
two subcores disposed within the cavity and axially seated against opposing edges of the locating feature, wherein a radial channel is formed between the subcores, the radial channel in fluid communication with the aperture of the housing, and wherein the subcores further including a plurality of winding channels along an axial length of each subcore, the plurality of winding channels structured to receive stator windings, and
stator windings disposed within the plurality of winding channels of the subcores, wherein the stator windings extend between the subcores and across the radial channel; and
a rotor operably attached to a shaft and disposed within the stator, the shaft structured to rotate about a longitudinal axis of the machine;
wherein the locating feature is offset from the aperture such that the locating feature does not obstruct a flowpath for coolant as the coolant is turned between a radial and an axial direction.

2. The machine of claim 1, wherein the housing comprises a plurality of apertures circumferential spaced about the wall and comprises a plurality of locating features positioned between the apertures.

3. The machine of claim 1, wherein the radial channel is perpendicular to the longitudinal axis.

4. The machine of claim 1, wherein the rotor is positioned relative to the stator to form a gap therebetween, the gap extending axially and parallel to the longitudinal axis, the gap further in fluid communication with the radial channel.

5. The machine of claim 1, wherein each subcore comprises a plurality of ducts radially spaced from the winding channels and parallel to the longitudinal axis, the ducts in fluid communication with the radial channel and extending from the radial channel to opposing sides of each subcore.

6. The machine of claim 1, wherein the locating feature does not interfere with the flow of coolant in the radial channel.

7. The machine of claim 1, wherein the locating feature is not a lamination of either of the two subcores.

8. The machine of claim 1, wherein the two subcores are separate lamination stacks independently located against the locating feature.

9. The machine of claim 1, wherein the two subcores each include laminations that are stacked and bonded together independently of each other.

* * * * *